United States Patent
Liu

(10) Patent No.: US 9,878,399 B2
(45) Date of Patent: Jan. 30, 2018

(54) METHOD AND APPARATUS FOR WELDING DISSIMILAR MATERIAL WITH A HIGH ENERGY HIGH POWER ULTRAFAST LASER

(71) Applicant: Jian Liu, Sunnyvale, CA (US)

(72) Inventor: Jian Liu, Sunnyvale, CA (US)

( * ) Notice: Subject to any disclaimer, the term of this patent is extended or adjusted under 35 U.S.C. 154(b) by 866 days.

(21) Appl. No.: 13/835,344

(22) Filed: Mar. 15, 2013

(65) Prior Publication Data
US 2014/0263207 A1    Sep. 18, 2014

(51) Int. Cl.
| | |
|---|---|
| B23K 26/00 | (2014.01) |
| B23K 26/32 | (2014.01) |
| B23K 26/03 | (2006.01) |
| B23K 26/046 | (2014.01) |
| B23K 26/26 | (2014.01) |
| B23K 26/323 | (2014.01) |
| B23K 26/211 | (2014.01) |
| B23K 26/082 | (2014.01) |
| B23K 26/0622 | (2014.01) |
| B23K 103/04 | (2006.01) |
| B23K 103/14 | (2006.01) |

(Continued)

(52) U.S. Cl.
CPC ........ *B23K 26/3233* (2013.01); *B23K 26/032* (2013.01); *B23K 26/046* (2013.01); *B23K 26/0624* (2015.10); *B23K 26/082* (2015.10); *B23K 26/211* (2015.10); *B23K 26/26* (2013.01); *B23K 26/323* (2015.10); *B23K 2203/04* (2013.01); *B23K 2203/14* (2013.01); *B23K 2203/15* (2015.10); *B23K 2203/18* (2013.01); *B23K 2203/20* (2013.01); *B23K 2203/26* (2015.10)

(58) Field of Classification Search
CPC .............. B23K 26/063; B23K 26/0635; B23K 26/0656; B23K 26/067; B23K 2201/40
USPC ............................................... 219/117.1–118
See application file for complete search history.

(56) References Cited

U.S. PATENT DOCUMENTS 5,656,186 A * 8/1997 Mourou .................. A61B 18/20
219/121.69
6,573,026 B1 * 6/2003 Aitken ................ C03C 23/0025
385/123

(Continued)

*Primary Examiner* — David Angwin
*Assistant Examiner* — Gyounghyun Bae
(74) *Attorney, Agent, or Firm* — Taboada Law Firm, PLLC; John M. Taboada

(57) ABSTRACT

Methods and systems for welding are disclosed, including generating electromagnetic radiation from an ultrashort pulse laser; coupling the electromagnetic radiation from the ultrashort pulse laser to a scanner comprising a scanning and focus range, wherein the scanner is configured to receive the electromagnetic radiation from the ultrashort laser and to scan and focus the electromagnetic radiation onto a joining interface of one or more materials; using a computer to adjust the pulse repetition rate and the average power of the ultrashort pulse laser; using one or more stages to position the joining interface; using a dichroic filter positioned between the scanner and the one or more materials; and focusing an imager and processor through the dichroic filter and onto the joining interface to monitor the joining interface of the one or more materials within the scanning and focus range of the electromagnetic radiation. Other embodiments are described and claimed.

8 Claims, 5 Drawing Sheets

(51) Int. Cl.
*B23K 103/18* (2006.01)
*B23K 103/20* (2006.01)
*B23K 103/08* (2006.01)

(56) References Cited

U.S. PATENT DOCUMENTS

| | | | | |
|---|---|---|---|---|
| 7,486,705 | B2* | 2/2009 | Shah | G01J 11/00 |
| | | | | 372/25 |
| 8,227,724 | B2* | 7/2012 | Fukuyo | B23K 26/0057 |
| | | | | 219/121.65 |
| 2003/0160034 | A1* | 8/2003 | Filgas | B23K 26/063 |
| | | | | 219/121.68 |
| 2004/0134894 | A1* | 7/2004 | Gu | B23K 26/04 |
| | | | | 219/121.68 |
| 2006/0088984 | A1* | 4/2006 | Li | B23K 26/38 |
| | | | | 438/463 |
| 2006/0195072 | A1* | 8/2006 | Miller | A61B 18/20 |
| | | | | 606/2 |
| 2006/0207976 | A1* | 9/2006 | Bovatsek | C03B 33/0222 |
| | | | | 219/121.69 |
| 2007/0051706 | A1* | 3/2007 | Bovatsek | B23K 26/0617 |
| | | | | 219/121.69 |
| 2007/0199927 | A1* | 8/2007 | Gu | B23K 26/04 |
| | | | | 219/121.69 |
| 2008/0000887 | A1* | 1/2008 | Sheth | B23K 26/0075 |
| | | | | 219/121.69 |
| 2010/0025387 | A1* | 2/2010 | Arai | B23K 26/0635 |
| | | | | 219/121.69 |
| 2010/0100084 | A1* | 4/2010 | Girard | A61B 18/20 |
| | | | | 606/13 |
| 2010/0187208 | A1* | 7/2010 | Dantus | G01J 11/00 |
| | | | | 219/121.72 |
| 2010/0213367 | A1* | 8/2010 | Miller | G01N 1/405 |
| | | | | 250/282 |
| 2010/0220752 | A1* | 9/2010 | Liu | H01S 3/06754 |
| | | | | 372/6 |
| 2012/0213236 | A1* | 8/2012 | Lundquist | H01S 3/0604 |
| | | | | 372/25 |

* cited by examiner

METHOD AND APPARATUS FOR WELDING DISSIMILAR MATERIAL WITH A HIGH ENERGY HIGH POWER ULTRAFAST LASER

I. BACKGROUND

The invention relates generally to the field of welding dissimilar materials. More particularly, the invention relates to a method and apparatus for welding dissimilar metals with a high repetition rate, high power ultrafast laser.

II. SUMMARY

In one respect, disclosed is an apparatus for welding comprising: an ultrashort pulse laser, wherein the ultrashort pulse laser generates an electromagnetic radiation, wherein the electromagnetic radiation comprises a wavelength, a pulse repetition rate, a pulse width, a pulse energy, and an average power; a scanner comprising a scanning and focus range, wherein the scanner is configured to receive the electromagnetic radiation from the ultrashort laser and to scan and focus the electromagnetic radiation onto a joining interface of one or more materials; a computer coupled to the ultrashort pulse laser, wherein the computer is configured to adjust the pulse repetition rate and the average power of the ultrashort pulse laser; one or more stages, wherein the one or more stages are configured to position the joining interface of the one or more materials within the scanning and focus range of the electromagnetic radiation; a dichroic filter positioned between the scanner and the one or more materials; and an imager and processor focused through the dichroic filter and onto the joining interface of the one or more materials, wherein the imager and processor are configured to monitor the joining interface of the one or more materials within the scanning and focus range of the electromagnetic radiation.

In another respect, disclosed is a method for welding comprising: generating electromagnetic radiation from an ultrashort pulse laser, wherein the electromagnetic radiation comprises a wavelength, a pulse repetition rate, a pulse width, a pulse energy, and an average power; coupling the electromagnetic radiation from the ultrashort pulse laser to a scanner comprising a scanning and focus range, wherein the scanner is configured to receive the electromagnetic radiation from the ultrashort laser and to scan and focus the electromagnetic radiation onto a joining interface of one or more materials; using a computer to adjust the pulse repetition rate and the average power of the ultrashort pulse laser; using one or more stages to position the joining interface of the one or more materials within the scanning and focus range of the electromagnetic radiation; using a dichroic filter positioned between the scanner and the one or more materials; and focusing an imager and processor through the dichroic filter and onto the joining interface of the one or more materials to monitor the joining interface of the one or more materials within the scanning and focus range of the electromagnetic radiation.

Numerous additional embodiments are also possible.

III. BRIEF DESCRIPTION OF THE DRAWINGS

Other objects and advantages of the invention may become apparent upon reading the detailed description and upon reference to the accompanying drawings.

Figure 1:
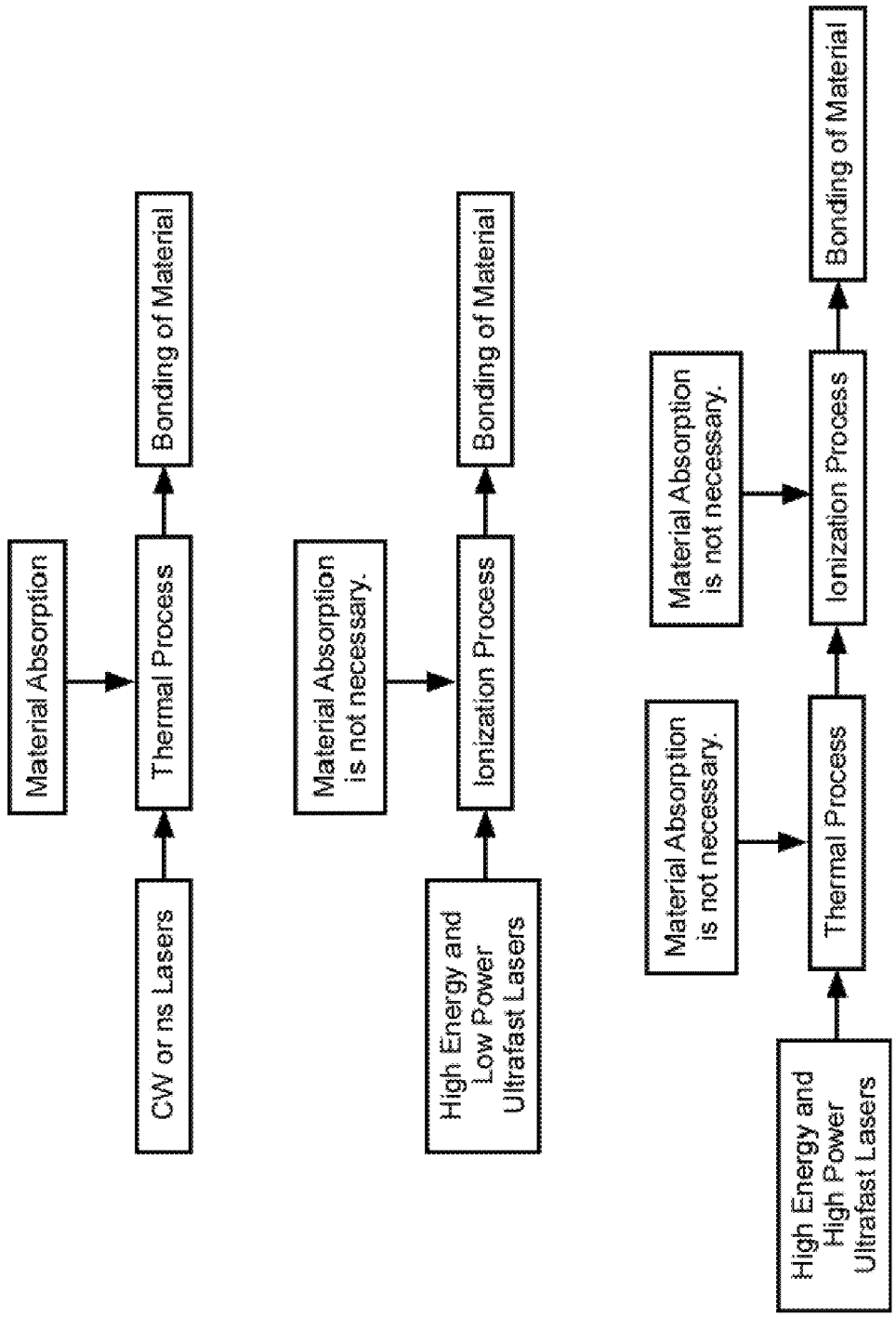
FIG. 1 is a block diagram showing the different processes involved in the bonding of material with different laser sources, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

IV. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

New materials are being selected and used in the automobile and aerospace industries in an attempt to reduce weight, save cost, and make cars and airplanes more energy saving and environmentally friendly. Polyvinyl chlorides, polypropylene ultra-fine fibers and other synthetic materials make up the car's interior from the dashboard cover to the floor mats. Aluminum alloys and new low weight steels are now the standard car material for engine blocks and wheels. Magnesium alloys are currently trying to be implemented to further reduce the weight by 50%. These new materials bring several challenges for the automobile manufacturing in material joining techniques, especially for joining dissimilar materials. Some of these challenging issues include: (i) thermal expansion mismatch due to the difference in thermal expansion coefficient and melting temperature of dissimilar materials, (ii) reduced temperature and load ranges due to the crack and residual welding stress, and (iii) increased directionality due to the formation of unstable inter-metallic phases. These three fundamental issues are correlated with each other and often impact the welding strength and reliability. One of the issues cannot be resolved without consideration of the other issues.

Currently, laser welders use Continuous-Wave (CW) or long-pulsed lasers. Unfortunately, CW or long-pulsed laser joining works only for selected materials that absorb at the laser wavelength. For the welding of dissimilar materials, the difference in the thermal expansion coefficients of the materials causes thermo-mechanical stresses in both materials resulting in a weak joint. Additionally, high power induced thermal diffusion outside the focal volume (i.e., the heat affected zone (HAZ)) may cause damage to the joint (e.g., cracks).

Different approaches have been tested to restrict the formation of inter-metallic phases. A few of these approaches include utilizing a pre and post weld heat treatment, applying a lower heat input to control the diffusion mechanism, offsetting the laser beam and using a combination of a higher laser power/higher welding speed, and/or applying a backing block below the samples to be welded to control the heat flow and suppress the thickness of the inter-metallic layer in the welding alloy. However, these approaches cannot resolve all of the three fundamental issues for dissimilar material welding. As an example, when welding aluminum and steel, since the melting temperature for aluminum is approximately 650° C. and that of steel is approximately 1538° C., the aluminum will melt and flow away before the steel is melted. Using an aluminum-steel transition insert may help, but it adds more complexity and cost to the welding process.

Given these challenges, methods and apparatuses to concurrently reduce the thermo-mechanical stresses, reduce the HAZ, and restrict the formation of inter-metallic phases are needed. The methods and apparatuses of the invention described herein may solve these shortcomings as well as others by proposing a novel method and apparatus for welding dissimilar materials with a high energy, high power ultrafast laser.

FIG. 1 is a block diagram showing the different processes involved in the bonding of material with different laser sources, in accordance with some embodiments.

With CW or ns laser, the bonding of materials is a thermal process which necessitates that the materials to be bonded absorb at the CW or ns laser wavelength. For high energy low power ultrafast lasers, the bonding of materials is an ionization process where material absorption is not necessary. In comparison, for the novel method and apparatus for welding dissimilar materials with a high energy, high power ultrafast laser of this invention, the bonding of materials is both an ionization process and a thermal process. Material absorption is not necessary in either the ionization process or the thermal process.

Figure 2:
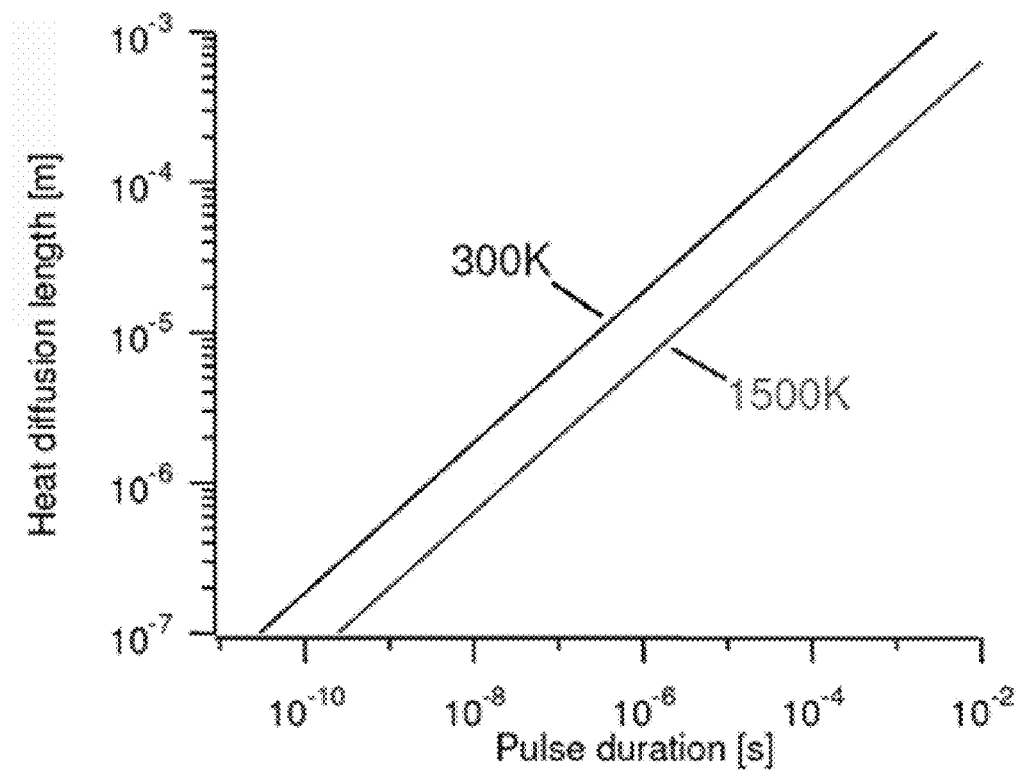
FIG. 2 is a graph of the heat diffusion length versus pulse duration, in accordance with some embodiments.

FIG. 2 is a graph of the heat diffusion length versus pulse duration, in accordance with some embodiments.

Figure 3:
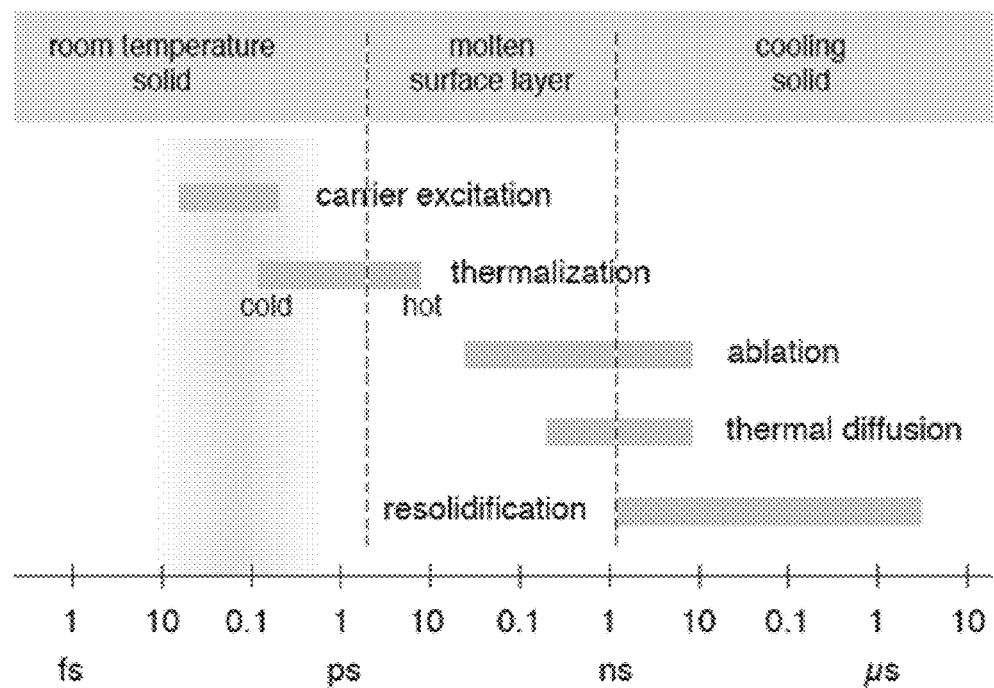
FIG. 3 is a graph of the material process mechanisms for pulsed lasers, in accordance with some embodiments.

FIG. 3 is a graph of the material process mechanisms for pulsed lasers, in accordance with some embodiments.

Femtosecond (fs) pulsed lasers have been widely used in many fields including optical waveguide writing, active photonic devices, and bonding of transparent materials. At the high peak intensity generated by fs lasers, a wide range of materials may be ionized and joined. The mechanism of ultrashort laser pulse modification of materials involves absorption of fs laser energy by materials (e.g., silicon, metal, glass, and polymer) and subsequent dissipation of the absorbed energy. FIG. 2 illustrates the heat diffusion length as a function of the pulse duration for a sample within a 300 K to 1500 K temperature range. As the pulse duration is shortened, the heat diffusion length is reduced, thus resulting in less HAZ.

The energy absorption process in the context of fs-laser ablation follows the sequential steps of 1) production of initial seed electrons through either nonlinear photoionization of free electrons or excitation of impurity defects, 2) avalanche photoionization, and 3) plasma formation. Note, the laser energy is only absorbed in the small focal volume of the laser, where the intensity is high enough for multi-photon ionization to occur in less than a picosecond (ps).

The energy dissipation process involves the transfer of the energy from the hot plasma created by laser pulses to the lattice, resulting in the modified regions in the material. This process is less well understood than the energy absorption process. It is known that the energy dissipation process occurs on a timescale of hundreds of nanoseconds (ns) to microseconds (µs), substantially longer than the hundreds of fs required for the energy absorption process. It is believed that the primary energy dissipation mechanisms are a combination of thermal diffusion and shockwave generation, though it remains uncertain about which process is dominant and may depend on the precise writing conditions (e.g., pulse fluence, repetition rate).

The end results of the fs laser-material interaction are related with physical, chemical, and mechanical changes of the material after exposure to the laser beam. FIG. 3 summarizes the mechanisms (carrier excitation, thermalization, ablation, thermal diffusion, and resolidification) that guide the laser processing. A rule of thumb is that when the pulse width is less than 1 ps, the thermal diffusion can be confined in micron dimension and HAZ can be reduced and/or even eliminated.

Figure 4:
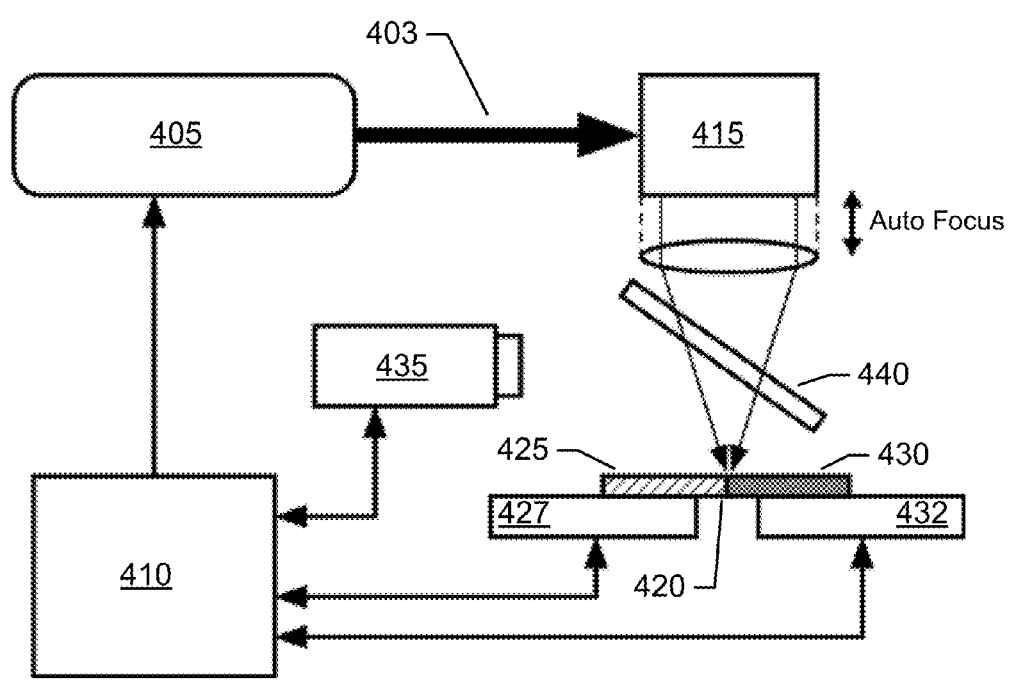
FIG. 4 is a schematic illustration of an apparatus for welding dissimilar material with a high energy high power ultrafast laser, in accordance with some embodiments.

FIG. 4 is a schematic illustration of an apparatus for welding dissimilar material with a high energy high power ultrafast laser, in accordance with some embodiments.

When ultrafast lasers are combined with high power (thermal induced bonding) kW level operation, both advantages of ultrafast process (ionization) and thermal process result in strong, high speed bonding. The ionization process helps disassemble the chemical or atomic bonds of the material being welded and re-bond through ultrafast chemical reaction to form strong stable phase structure. This process of bond disassembly does not occur for thermal bonding. The high power operation further helps strengthen the bonding areas. Moreover, the high power operation further reduces the threshold of ionization and results in the strong bonding of dissimilar materials.

In some embodiments, a high energy, high power laser pulse 403 is generated by a high pulse repetition rate (PRR) fs fiber laser 405. The high energy, high power laser may also be a thin disk laser or a hybrid fiber laser/thin disk laser. The laser will have a PRR from about 1 MHz up to 1 GHz, an average power of about 1 to 2000 W, a pulse width of about 0.1 to 10 ps, an energy from about 1 µJ to 1 mJ, and a wavelength between about 0.2 to 3 Ideally, it should be diffraction limited beam quality (single mode), but in practice, it can be multi-mode as well. Examples of ultrafast fiber lasers include but are not limited to Ytterbium (Yb) doped fiber laser at 1025-1100 nm and its harmonic generations to green and UV, Erbium (Er) doped fiber laser at 1025-1610 nm and its harmonic generations, Thulium (Tm) doped fiber laser at 1950-2050 nm, Holmium (Ho) doped fiber laser at 2050-2150 nm, and Er:ZBLAN fiber lasers at 2700-2900 nm. Examples of thin disk lasers include but are not limited to Potassium Gadolinium Tungstate (KGW) or Potassium Yttrium Tungstate (KYW) based lasers (1030-1070 nm) and its harmonic generations. Examples of hybrid fiber laser/thin disk laser include using fs fiber laser as a seeding laser for thin disk amplifier to obtain both high energy and high power fs lasers.

A computer 410 is used to control the PRR and the power of the laser 405. The high energy, high power pulse 403 is coupled into an auto focusing scanner 415 which scans and focuses the pulse 403 onto the joining interface of two dissimilar materials or samples 425 and 430 resulting in a strong weld bond 420 between the two dissimilar samples. Each of the samples, 425 and 430, may be positioned using their own linear and rotary motor stages, 427 and 432, respectively. The linear and rotary motor stages, 427 and 432, may be controlled by the computer 410. An imager and processor 435, such as a CCD, may also be controlled by the computer 410. The imager and processor 435 monitors the samples through a dichroic filter 440 as the samples are being welded. The scanner may be an acousto-optic type scanner (diffraction), a magnetic resonant scanner, a mechanical scanner (rotating mirror), or an electro-optic scanner, etc.

Compared with conventional CW or nanosecond laser joining techniques (thermally melted welding), the high energy, high power fs laser system of FIG. 4 creates a much stronger bond between the dissimilar samples 425 and 430 through ultrafast ionization, chemical reaction, and thermal welding. The weld involves localized heating and is HAZ free since the weld is accomplished by precise focusing of the ultrafast pulses on the joining interface of the dissimilar samples. The resulting high peak intensity in the focal region ionizes the material of the samples and creates hot plasma at the interface with limited to no impact on the surrounding area (i.e., HAZ free). As the molten pool is localized and quickly built up only in the vicinity of the focus, the thermal stress and thermally induced cracks are largely suppressed. As a result of the nonlinear absorption around the focal volume of the laser pulses, the high energy, high power fs laser system can achieve highly space-selective joining with a spatial resolution of sub-micron resulting in a stable sub-micron joining weld. Additionally, within an ultrashort period, the localized heating helps form stable phase structure. As an example, bonding between Nickel Titanium (NiTi) and steel using a high energy, high power fs laser system forms stable single phase supersaturated β-Ti(Fe) structure.

In some embodiments, reduced directionality of the weld may be achieved by using circularly polarized high energy, high power fs laser pulses scanned quickly and rotationally in micron scale onto the joining interface of the dissimilar materials. Doing so may break the directionality of dendritic structures, thus making the weld joint robust against mechanical and thermal stresses in all directions.

Figure 5:
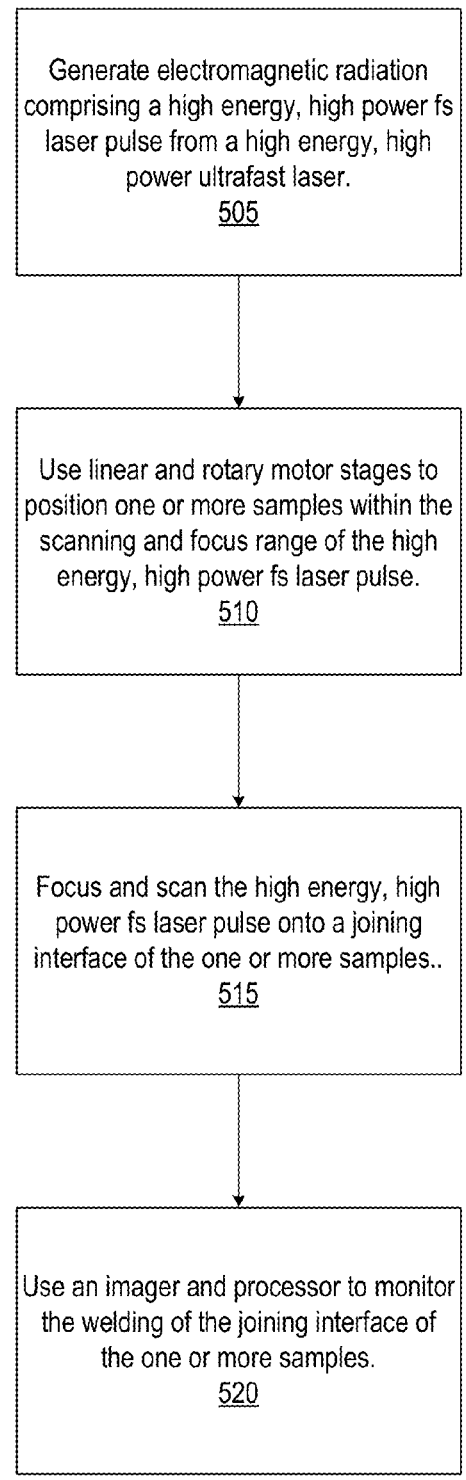
FIG. 5 is a block diagram illustrating a method for welding dissimilar material with a high energy high power ultrafast laser, in accordance with some embodiments.

FIG. 5 is a block diagram illustrating a method for welding dissimilar material with a high energy high power ultrafast laser, in accordance with some embodiments.

In some embodiments, processing begins at step 505 where a high energy, high power ultrafast laser is used to generate electromagnetic radiation comprising a high energy, high power fs laser pulse. The main characteristic of the ultrashort laser pulse is the high peak intensity that results in rapid (picosecond) delivery of energy into the material, which is much faster than the plasma expansion (nanosecond to microsecond), thus significantly reducing or eliminating thermal damages. In some embodiments, the high energy, high power laser pulse is generated by a high PRR fs fiber laser. The high energy, high power laser may also be a thin disk laser or a hybrid fiber laser/thin disk laser. The laser will have a PRR from about 1 MHz up to 1 GHz, an average power of about 1 to 2000 W, a pulse width of about 0.1 to 10 ps, an energy from about 1 µJ to 1 mJ, and a wavelength between about 0.2 to 3 Examples of ultrafast fiber lasers include but are not limited to Yb doped fiber laser at 1025-1100 nm and its harmonic generations to green and UV, Er doped fiber laser at 1025-1610 nm and its harmonic generations, Tm doped fiber laser at 1950-2050 nm, Ho doped fiber laser at 2050-2150 nm, and Er:ZBLAN fiber lasers at 2700-2900 nm. Examples of thin disk lasers include but are not limited to KGW or KYW based lasers (1030-1070 nm) and its harmonic generations. At step 510, linear and rotary motor stages are used to position one or more samples within the scanning and focus range of the high energy, high power fs laser pulse. At step 515, the high energy, high power fs laser pulse is focused and scanned onto a joining interface of the one or more samples. The resulting high peak intensity in the focal region ionizes the material of the samples and creates hot plasma at the interface with limited to no impact on the surrounding area (i.e., HAZ free). As the molten pool is localized and quickly built up only in the vicinity of the focus, the thermal stress and thermally induced cracks are largely suppressed. In some embodiments, the high energy, high power fs laser pulse comprises circularly polarized laser pulses which are rotationally scanned in micron scale across the joining interface of the one or more samples in order to break the directionality of dendritic structures. The resulting weld joint is more robust against mechanical and thermal stresses in all directions. In some embodiments, the method further comprises at step 520, the use of an imager and processor to monitor the joining interface of the one or more samples as they are being welded.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A method for welding dissimilar materials comprising:
generating electromagnetic radiation from an ultrashort pulse laser, wherein the electromagnetic radiation has a wavelength, a pulse repetition rate, a pulse width, a pulse energy, and an average power;
coupling the electromagnetic radiation from the ultrashort pulse laser to a scanner having a scanning and focus range, wherein the scanner is configured to receive the electromagnetic radiation from the ultrashort pulse laser and to scan and focus the electromagnetic radiation onto a joining interface of one or more materials;
bonding the one or more materials at the joining interface by scanning and focusing the electromagnetic radiation onto the joining interface in order to initiate an ionization process and a thermal process at the joining interface of the one or more materials, wherein the ionization process has ionizing and ablating the one or more materials, and wherein the thermal process has melting, thermally diffusing, and resolidifying the one or more materials; and using a computer to adjust the pulse repetition rate and the average power of the ultrashort pulse laser;

wherein the wavelength of the electromagnetic radiation generated from the ultrashort pulse laser ranges from about 0.2 µm to 3 µm; and wherein the pulse repetition rate and the pulse energy of the electromagnetic radiation range between about 1 MHz at about 1 µJ, about 1 MHz at about 1 mJ, about 500 MHz at about 1 mJ, and about 500 MHz at about 1 µJ.

2. The method of claim 1 further comprising using one or more stages to position the joining interface of the one or more materials within the scanning and focus range of the electromagnetic radiation.

3. The method of claim 1 further comprising using a dichroic filter positioned between the scanner and the one or more materials; and focusing an imager and processor through the dichroic filter and onto the joining interface of the one or more materials to monitor the joining interface of the one or more materials within the scanning and focus range of the electromagnetic radiation.

4. The method of claim 1, wherein the ultrashort pulse laser comprises at least one of a Yb doped fiber laser, an Er doped fiber laser, a Tm doped fiber laser, a Ho doped fiber laser, an Er:ZBLAN fiber laser, a KGW thin disk laser, and a KYW thin disk laser.

5. The method of claim 1, wherein the pulse width of the electromagnetic radiation generated from the ultrashort pulse laser ranges from about 0.1 ps to 10 ps.

6. The method of claim 1, wherein the average power of the electromagnetic radiation generated from the ultrashort pulse laser ranges from about 1 W to 2000 W.

7. The method of claim 1, wherein the electromagnetic radiation is circularly polarized.

8. The method of claim 1 further comprising rotationally scanning on a micron scale the electromagnetic radiation onto the joining interface of the one or more materials.

* * * * *